United States Patent
Yamazaki et al.

(10) Patent No.: US 9,011,702 B2
(45) Date of Patent: Apr. 21, 2015

(54) METHOD FOR MANUFACTURING ELECTRODE FOR POWER STORAGE DEVICE AND METHOD FOR MANUFACTURING POWER STORAGE DEVICE

(75) Inventors: Shunpei Yamazaki, Tokyo (JP); Kazutaka Kuriki, Kanagawa (JP); Junpei Momo, Kanagawa (JP); Rie Matsubara, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 535 days.

(21) Appl. No.: 12/888,633

(22) Filed: Sep. 23, 2010

(65) Prior Publication Data

US 2011/0073561 A1    Mar. 31, 2011

(30) Foreign Application Priority Data

Sep. 30, 2009   (JP) ................................. 2009-226294

(51) Int. Cl.
| | |
|---|---|
| *H01G 4/00* | (2006.01) |
| *H01G 5/00* | (2006.01) |
| *H01G 7/00* | (2006.01) |
| *H01G 9/00* | (2006.01) |
| *H01G 13/00* | (2013.01) |

(Continued)

(52) U.S. Cl.
CPC ............... *H01G 9/016* (2013.01); *H01G 9/055* (2013.01); *H01G 9/058* (2013.01); *H01G 11/26* (2013.01); *H01G 11/28* (2013.01); *H01G 11/86* (2013.01); *H01M 4/0438* (2013.01); *H01M 4/0445* (2013.01); *H01M 4/13* (2013.01); *H01M 4/139* (2013.01); *H01M 4/661* (2013.01); *H01G 11/50* (2013.01); *H01M 10/0525* (2013.01); *Y02E 60/122* (2013.01); *Y02E 60/13* (2013.01)

(58) Field of Classification Search
USPC .......................................................... 216/13
See application file for complete search history.

(56) References Cited

U.S. PATENT DOCUMENTS

| | | | |
|---|---|---|---|
| 4,409,134 A | 10/1983 | Yamazaki | |
| 6,617,626 B2 * | 9/2003 | Ozawa et al. ................. | 257/295 |

(Continued)

FOREIGN PATENT DOCUMENTS

| | | |
|---|---|---|
| CN | 001415121 A | 4/2003 |
| EP | 1231651 A | 8/2002 |

(Continued)

OTHER PUBLICATIONS

Chinese Office Action (Application No. 201010512983.9) Dated Mar. 3, 2014.

*Primary Examiner* — Binh X Tran
*Assistant Examiner* — Thomas Pham
(74) *Attorney, Agent, or Firm* — Fish & Richardson P.C.

(57) ABSTRACT

One of objects is to reduce the effect caused by the volume expansion of an active material. An embodiment is a method for manufacturing an electrode for a power storage device which includes an active material over one of surfaces of a current collector. The active material is formed by forming a conductive body functioning as the current collector; forming a mixed layer including an amorphous region and a microcrystalline region over one of surfaces of the conductive body; and etching the mixed layer selectively, so that a part of or the whole of the amorphous region is removed and the microcrystalline region is exposed. Thus, the effect caused by the volume expansion of the active material is reduced.

19 Claims, 8 Drawing Sheets

(51) Int. Cl.
*H01B 13/00* (2006.01)
*B31D 3/00* (2006.01)
*C25F 3/00* (2006.01)
*H01M 4/13* (2010.01)
*H01M 4/58* (2010.01)
*H01G 9/008* (2006.01)
*H01G 9/055* (2006.01)
*H01G 9/04* (2006.01)
*H01G 11/26* (2013.01)
*H01G 11/28* (2013.01)
*H01G 11/86* (2013.01)
*H01M 4/04* (2006.01)
*H01M 4/139* (2010.01)
*H01M 4/66* (2006.01)
*H01G 11/50* (2013.01)
*H01M 10/0525* (2010.01)

(56) References Cited

U.S. PATENT DOCUMENTS

| | | |
|---|---|---|
| 6,685,804 B1 | 2/2004 | Ikeda et al. |
| 6,887,511 B1 | 5/2005 | Shima et al. |
| 7,192,673 B1 | 3/2007 | Ikeda et al. |
| 7,195,842 B1 | 3/2007 | Fujimoto et al. |
| 7,235,330 B1 | 6/2007 | Fujimoto et al. |
| 7,241,533 B1 | 7/2007 | Ikeda et al. |
| 7,402,829 B2 | 7/2008 | Green |
| 7,410,728 B1 | 8/2008 | Fujimoto et al. |
| 7,683,359 B2 | 3/2010 | Green |
| 7,794,881 B1 | 9/2010 | Fujimoto et al. |
| 2002/0158278 A1 | 10/2002 | Ozawa et al. |
| 2004/0058492 A1* | 3/2004 | Tatsumi .................. 438/240 |
| 2004/0063278 A1* | 4/2004 | Lian et al. .............. 438/243 |
| 2005/0029907 A1* | 2/2005 | Uchiyama et al. ...... 310/367 |
| 2006/0275930 A1* | 12/2006 | Kijima ........................ 438/3 |
| 2007/0194391 A1* | 8/2007 | Murthy et al. ........... 257/387 |
| 2008/0153000 A1* | 6/2008 | Salot et al. ............. 429/218.1 |
| 2009/0001936 A1* | 1/2009 | Green ...................... 320/137 |
| 2009/0117264 A1* | 5/2009 | Weydanz et al. ........ 427/123 |
| 2009/0126589 A1* | 5/2009 | Maxwell et al. ....... 101/450.1 |
| 2010/0065851 A1* | 3/2010 | Makita ..................... 257/72 |
| 2010/0068415 A1* | 3/2010 | Roca Cabarrocas et al. ........ 427/575 |
| 2010/0156353 A1* | 6/2010 | Iyer et al. ................ 320/137 |
| 2010/0310936 A1* | 12/2010 | Ohira et al. ............. 429/221 |

FOREIGN PATENT DOCUMENTS

| | | |
|---|---|---|
| EP | 1231653 A | 8/2002 |
| EP | 1231654 A | 8/2002 |
| EP | 1237210 A | 9/2002 |
| EP | 1244163 A | 9/2002 |
| EP | 1244164 A | 9/2002 |
| EP | 1246278 A | 10/2002 |
| JP | 2000-340541 A | 12/2000 |
| JP | 2003-017040 A | 1/2003 |
| JP | 2007-123096 A | 5/2007 |
| JP | 2007-165226 A | 6/2007 |
| JP | 2007-310116 A | 11/2007 |
| JP | 2008-159589 A | 7/2008 |
| JP | 2009-076278 A | 4/2009 |
| JP | 2009-134917 A | 6/2009 |
| JP | 2009-134917 A | 6/2009 |
| WO | WO-01/29912 | 4/2001 |
| WO | 2004/042851 A2 | 5/2004 |
| WO | WO 2009125187 A1 * | 10/2009 |

* cited by examiner

METHOD FOR MANUFACTURING ELECTRODE FOR POWER STORAGE DEVICE AND METHOD FOR MANUFACTURING POWER STORAGE DEVICE

BACKGROUND OF THE INVENTION

1. Field of the Invention

One embodiment of the present invention relates to a method for manufacturing an electrode for a power storage device. Further, one embodiment of the present invention relates to a method for manufacturing a power storage device.

Note that the power storage device indicates all elements and devices which have a function of storing power.

2. Description of the Related Art

In recent years, the development of power storage devices such as a lithium-ion secondary battery and a lithium-ion capacitor has been conducted.

In the above electrode for a power storage device, an active material is formed over a surface of a current collector. As the active material, a material to/from which ions functioning as carriers can be adsorbed or desorbed, such as carbon or silicon is used. For example, silicon has large theoretical capacity and an advantage in large capacity of the power storage device. In such an active material, stress is generated due to volume expansion by charging and discharging operation, which causes, for example, separation of an active material layer from a current collector layer; therefore, capacitance characteristics (also referred to as charge-discharge cycle properties) of the power storage device could deteriorate when the charging and discharging operation is repeated. Thus, some techniques for mitigating the effect caused by the volume expansion of the active material have been proposed (for example, Patent Document 1).

REFERENCE

[Patent Document 1] Japanese Published Patent Application No. 2009-134917

SUMMARY OF THE INVENTION

An object of one embodiment of the present invention is to reduce the effect caused by volume expansion of the active material layer.

According to one embodiment of the present invention, an active material is provided over one of surfaces of a current collector, and the active material includes a plurality of microcrystalline grains which are provided over the surface of the current collector and has projections and depressions. With the above structure, the effect caused by volume expansion of the active material is reduced.

One embodiment of the present invention is a method for manufacturing an electrode for a power storage device which includes an active material over one of surfaces of a current collector. The active material is formed by the steps of forming a conductive body functioning as the current collector, forming a mixed layer including an amorphous region and a microcrystalline region over one of surfaces of the conductive body, and etching the mixed layer selectively, so that a part of or a whole of the amorphous region is removed and the microcrystalline region is exposed.

One embodiment of the present invention is a method for manufacturing an electrode for a power storage device, where the etching is performed with use of a mixed solution, as an etchant, which includes a substance oxidizing the amorphous region and a substance dissolving the oxidized amorphous region.

One embodiment of the present invention is a method for manufacturing an electrode for a power storage device, where potassium chromate is used as the substance oxidizing the amorphous region and hydrofluoric acid is used as the substance dissolving the oxidized amorphous region.

One embodiment of the present invention is a method for manufacturing an electrode for a power storage device, where the etching is performed with use of a mixed solution, as an etchant, which includes a substance oxidizing the amorphous region, a substance dissolving the oxidized amorphous region, and a substance controlling the speed of oxidation of the amorphous region and the speed of dissolution of the oxidized amorphous region.

One embodiment of the present invention is a method for manufacturing an electrode for a power storage device, where nitric acid is used as the substance oxidizing the amorphous region, hydrofluoric acid is used as the substance dissolving the oxidized amorphous region, and acetic acid is used as the substance controlling the speed of oxidation of the amorphous region and the speed of dissolution of the oxidized amorphous region.

One embodiment of the present invention is a method for manufacturing an electrode for a power storage device, where the grain size of the microcrystal is equal to or larger than 2 nm and equal to or smaller than 50 nm.

One embodiment of the present invention is a method for manufacturing a power storage device which includes a positive electrode, a negative electrode, and an electrolyte, where the negative electrode is formed with any of the above present inventions.

According to one embodiment of the present invention, the active material which has projections and depressions and includes the microcrystalline grains can be formed, whereby the effect caused by volume expansion of the active material can be reduced.

DETAILED DESCRIPTION OF THE INVENTION

Figure 1A:
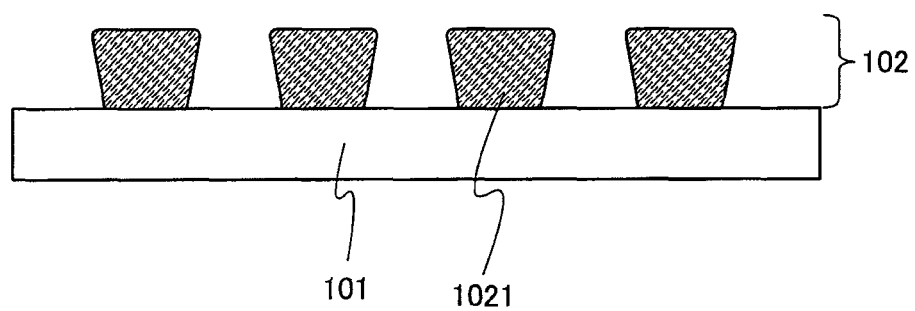
FIGS. 1A and 1B are schematic cross-sectional views each illustrating an example of a structure of an electrode for a power storage device in Embodiment 1.

Hereinafter, embodiments of the present invention will be described with reference to the drawings. Note that the present invention is not limited to the following description because it will be easily understood by those skilled in the art that various changes and modifications can be made without departing from the spirit and scope of the present invention. Therefore, the present invention should not be interpreted as being limited to the description of the embodiments to be given below. In description with reference to the drawings, in some cases, the same reference numerals are used in common for the same portions in different drawings. Further, in some cases, the same hatching patterns are applied to similar parts, and the similar parts are not necessarily designated by reference numerals.

Embodiment 1

In this embodiment, an electrode for a power storage device which is one embodiment of the present invention and a manufacturing method thereof will be described.

First, structures of an electrode for a power storage device of this embodiment are described with reference to FIGS. 1A and 1B and FIGS. 2A and 2B. FIGS. 1A and 1B and FIGS. 2A and 2B are schematic cross-sectional views are examples each illustrating a structure of an electrode for a power storage device of this embodiment.

An electrode for a power storage device illustrated in FIG. 1A includes a current collector 101 and an active material 102 provided over one of surfaces of the current collector 101.

The current collector 101 is formed using a conductive body including a conductive material or the like. As the conductive material applicable to the conductive body, aluminum, copper, nickel, or titanium can be given, for example.

The active material 102 includes a plurality of microcrystalline grains 1021 provided over one of surfaces of the current collector 101.

The microcrystalline grain 1021 is formed using a material capable of forming crystal, for example, a microcrystalline semiconductor. Note that in this specification, the microcrystalline semiconductor refers to a crystalline semiconductor which has a crystal, a state which is stable in free energy, short-range order, and lattice distortion. The grain size of the microcrystalline semiconductor is from 2 nm to 200 nm inclusive, preferably 10 nm to 80 nm inclusive, further preferably, 20 nm to 50 nm inclusive. The crystals have a columnar shape or a projected shape and grow in a normal direction with respect to the surface of the current collector. Therefore, a crystal grain boundary is formed at the interface between the crystals in some cases. Note that in this specification, an aggregate of a plurality of microcrystalline grains is also referred to as "a microcrystalline grain".

As the material capable of forming a crystal, for example, silicon, tin, germanium, or aluminum can be given.

Microcrystalline silicon which is a typical example of the microcrystalline semiconductor has a peak of Raman spectrum which is shifted to a lower wave number side than 520 cm$^{-1}$ that represents single crystal silicon. That is, the peak of the Raman spectrum of microcrystalline silicon is located between 480 cm$^{-1}$, which represents amorphous silicon, and 520 cm$^{-1}$, which represents single crystal silicon.

Figure 1B:
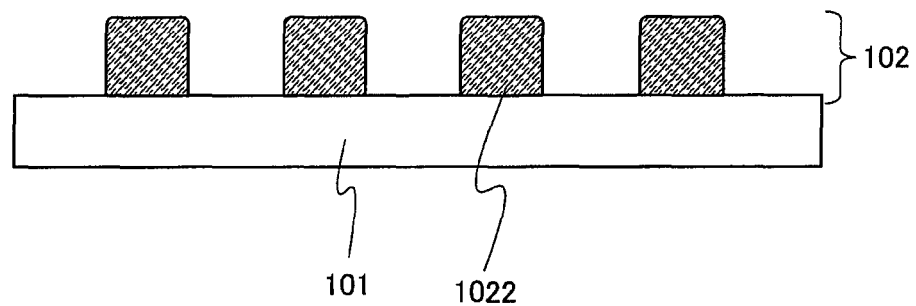
Figure 2A:
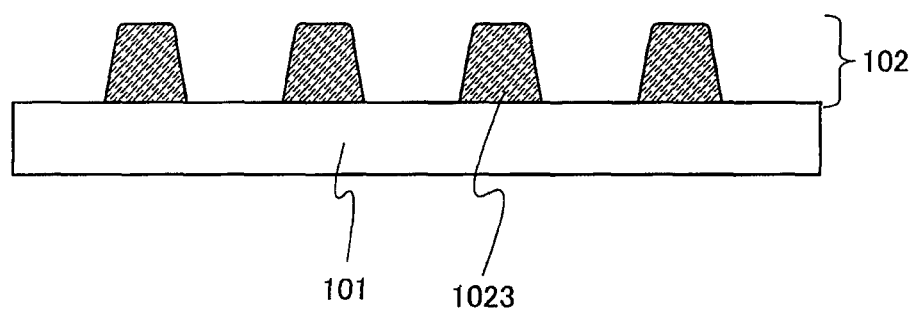
FIGS. 2A and 2B are schematic cross-sectional views each illustrating an example of a structure of an electrode for a power storage device in Embodiment 1.
Figure 2B:
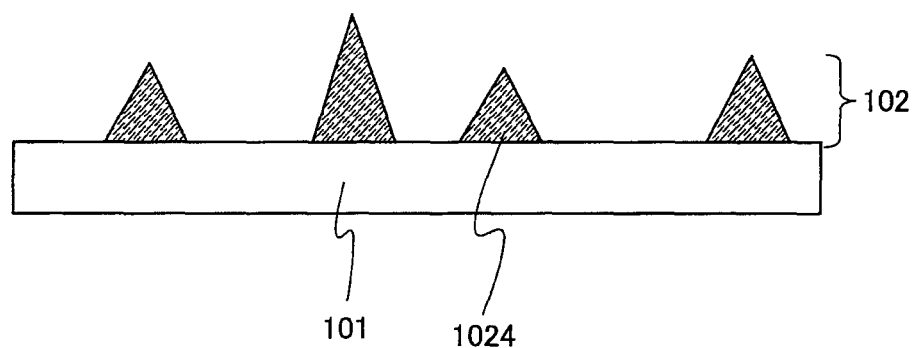

Note that the electrode for a power storage device illustrated in FIG. 1A has a structure in which the microcrystalline grain 1021 having inversely-tapered side surfaces is provided over the surface of the current collector 101. However, the structure of the electrode for a power storage device is not limited thereto. For example, the following structures can be employed: a structure in which microcrystalline grain 1022 having side surfaces perpendicular to the current collector 101 is provided over the surface of the current collector 101 as illustrated in FIG. 1B; a structure in which microcrystalline grain 1023 having tapered side surfaces is provided over the surface of the current collector 101 as illustrated in FIG. 2A; and a structure in which microcrystalline grain 1024 in a needle-like shape is provided over the surface of the current collector 101 as illustrated in FIG. 2B. In addition, the size of the microcrystalline grains may be different from each other as illustrated in FIG. 2B. The shapes of the microcrystalline grain 1022 and the microcrystalline grain 1023 can be obtained by etching the microcrystalline grain 1021, for example.

In the electrode for a power storage device illustrated in FIG. 1A, the microcrystalline grains 1021 are arranged at an appropriate interval. Here, the microcrystalline grains 1021 may be arranged at irregular interval. In addition, the arrangement is not necessarily limited to the above, and each of the microcrystalline grains 1021 may be provided to be in contact with the adjacent microcrystalline grain 1021. In the case of employing the structure in which the microcrystalline grains 1021 are arranged at a regular interval, an electrode area can be increased. Although the active material 102 illustrated in FIG. 1A includes only the microcrystalline grains 1021, the structure of the active material 102 is not limited to the above. For example, an amorphous region is also included in the active material 102, so that the active material 102 can be formed in a projected and depressed shape by including the amorphous region and the microcrystalline region.

Further, a structure can be employed, in which a buffer layer is formed on the surface of the current collector 101 and a layer including the microcrystalline grain 1021 is formed over the current collector 101 with the buffer layer interposed therebetween. As the buffer layer, a microcrystalline semiconductor layer including an impurity element, or the like can be used. Provision of the buffer layer enables an increase in adhesion between the active material and the current collector, a reduction in contact resistance therebetween, and the like.

As illustrated in FIGS. 1A and 1B, one example of the electrode for a power storage device of this embodiment has a structure in which the active material has projections and depressions, i.e., a structure in which a plurality of microcrystalline grains are provided over one of surfaces of the current collector. In the case where the active material is a material such as silicon, the volume of which is expanded by insertion of ions functioning as carriers, the effect caused by the volume expansion of the material included in the active material can be reduced. The effect caused by the volume expansion indicates, for example, separation of the active material from the current collector, or the like.

Figure 3A:
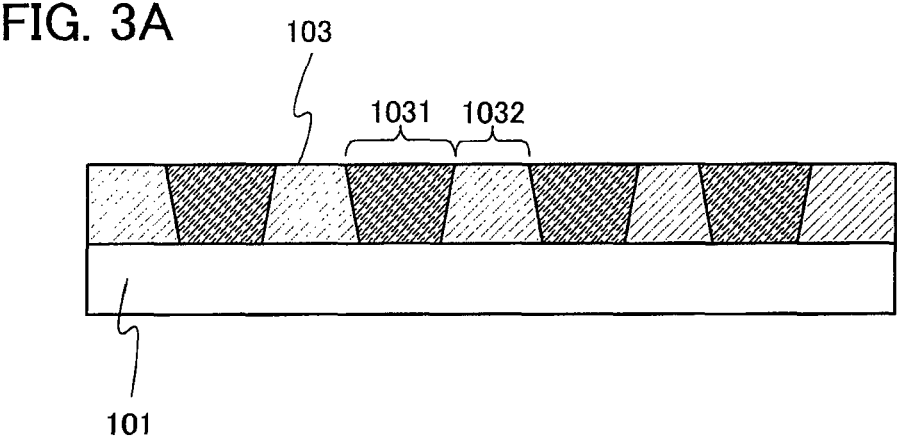
FIGS. 3A and 3B are schematic cross-sectional views illustrating an example of a method for manufacturing an electrode for a power storage device in Embodiment 1.
Figure 3B:
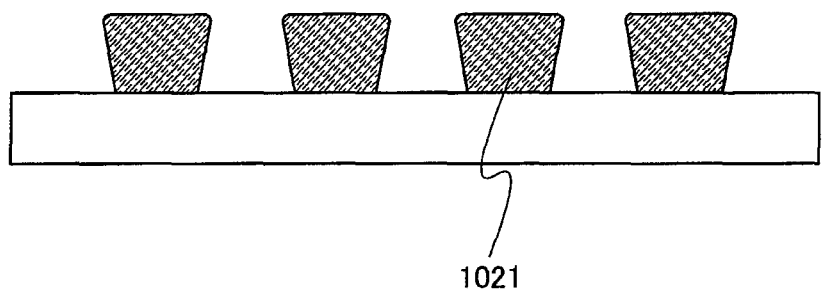

Next, a manufacturing method of an electrode for a power storage device of this embodiment will be described with reference to FIGS. 3A and 3B. FIGS. 3A and 3B are cross-sectional views illustrating an example of a manufacturing method of the electrode for a power storage device illustrated in FIG. 1A.

First, as illustrated in FIG. 3A, a conductive body functioning as the current collector 101 is prepared, and a mixed layer 103 is formed over the conductive body.

As the conductive body functioning as the current collector 101, a conductive plate formed using a conductive material such as aluminum, copper, nickel, titanium, or the like can be used. Alternatively, as the current collector 101, an alloy material including a plural materials selected from the above conductive materials, e.g., an Al—Ni alloy or an Al—Cu alloy, can be used.

The conductive body is not limited to a conductive plate. For example, the current collector 101 can be formed using a conductive layer which has been separately formed over a substrate and then separated from the substrate.

The mixed layer 103 is a layer which has a microcrystalline region including microcrystalline grains and the other region different from the microcrystalline region. The other region can be an amorphous region or like, but not limited thereto. The other region may include a plurality of regions. Here, as an example, the mixed layer 103 has at least a microcrystalline region 1031 and an amorphous region 1032 as illustrated in FIG. 3A. The mixed layer 103 can be formed by a plasma CVD method for example. An example of formation method of the mixed layer 103 is further described.

The mixed layer 103 can be formed by depositing a semiconductor film such as a microcrystalline silicon film, a microcrystalline silicon germanium film, or a microcrystalline germanium film.

In the case of forming the mixed layer 103 using a microcrystalline silicon germanium film, the microcrystalline silicon germanium film can be formed by glow discharge plasma with use of a mixture of a deposition gas containing silicon, a deposition gas containing germanium, and hydrogen, in a reaction chamber of a plasma CVD apparatus. Further, a microcrystalline silicon film or a microcrystalline germanium film can be formed by glow discharge plasma with use of a mixture of a deposition gas containing silicon or germanium; hydrogen; and a rare gas such as helium, neon, or krypton. Microcrystalline silicon, microcrystalline silicon germanium, microcrystalline germanium, or the like is formed using the deposition gas containing silicon or germanium, which is diluted with hydrogen so that the flow rate of hydrogen is 10 to 2000 times, preferably 10 to 200 times that of the deposition gas. In this embodiment, a microcrystalline silicon film with a thickness of 3 μm is formed as an example.

Typical examples of the deposition gas containing silicon or germanium are $SiH_4$, $Si_2H_6$, $GeH_4$, $Ge_2H_6$, and the like. Note that by control of the flow rate of the deposition gas containing silicon or germanium, the size of crystal grains of a microcrystalline film to be formed can be controlled.

A rare gas such as helium, argon, neon, krypton, or xenon is used as a source gas for the mixed layer 103, whereby the deposition rate of the mixed layer 103 can be increased. When the deposition rate is increased, the amount of impurities mixed into the mixed layer 103 can be reduced, whereby the crystallinity of the mixed layer 103 can be improved.

Note that as plasma for formation of the mixed layer 103, for example, RF (3 MHz to 30 MHz, typically 13.56 MHz, 27 MHz) plasma, VHF (30 MHz to 300 MHz, typically 60 MHz) plasma, or microwave (greater than or equal to 1 GHz, typically 2.45 GHz) plasma can be used. Plasma is preferably generated in a pulsed manner. Note that glow discharge plasma is generated by application of a high-frequency voltage with a frequency of 3 MHz to 30 MHz, typically 13.56 MHz or 27.12 MHz in the HF band; or a high-frequency voltage with a frequency of greater than 30 MHz to about 300 MHz in the VHF band, typically, a high-frequency voltage of 60 MHz. Alternatively, glow discharge plasma is generated by application of a high-frequency voltage with a microwave frequency that is greater than or equal to 1 GHz. With the use of high-frequency voltage in the VHF band or with a microwave frequency, the deposition rate can be increased. In addition, the high frequency voltage in the HF band is superimposed with the high-frequency voltage in the VHF band, whereby unevenness of plasma in a large-sized current collector is reduced, the uniformity of a film to be formed can be increased, and the deposition rate can be increased.

Note that in the case of forming the mixed layer 103 using a microcrystalline silicon film, in order to terminate the dangling bond, hydrogen or halogen of at least 1 atomic % or more may be included in the microcrystalline silicon film. Furthermore, a rare gas element such as helium, argon, krypton, or neon may be included in the microcrystalline silicon film so as to further enhance lattice distortion therein. As a result, stability in the microcrystalline structure is enhanced, so that a preferable microcrystalline semiconductor can be obtained. Such a technique of the microcrystalline semiconductor is disclosed in, for example, U.S. Pat. No. 4,409,134.

Note that the formation method of the mixed layer 103 described above is just an example, and another method may be used as long as the microcrystalline grain 1021 can be formed.

Note that the temperature at depositing a film to be the mixed layer is not particularly limited. For example, when deposition is performed at low temperature of 200° C. or lower, the film is deposited at high deposition rate, and the bonding number of Si—H bonds or Si—$H_2$ bonds is increased, so that the film has many defects. That is, the mixed layer including many defects and many microcrystalline grains can be formed. In the case of deposition at a temperature of 200° C. or lower, a part of or the whole of the amorphous region in the mixed layer is not necessarily removed.

Next, the mixed layer 103 is subjected to etching treatment. As the etchant treatment, for example, wet etching is performed with use of a solution as etchant, which includes a substance oxidizing a semiconductor material and a substance dissolving the oxidized semiconductor material. The etching treatment is preferably performed for one minute or shorter, and the preferable temperature of the mixed solution is set at approximately 10° C. to 30° C.; for example, 25° C. is preferable.

As the substance oxidizing a semiconductor material, for example, nitric acid, chromium oxide, or potassium chromate can be used. As the substance dissolving the oxidized semiconductor material, for example, hydrofluoric acid can be used. As an etchant, a solution can be used, which includes a substance controlling the speed of oxidation of the semiconductor material and the speed of dissolution of the oxidized semiconductor material in addition to the substance oxidizing a semiconductor material and the substance dissolving the oxidized semiconductor material. As the substance controlling the speed of oxidation of the semiconductor material and the speed of dissolution of the oxidized semiconductor material, for example, acetic acid or hydrogen peroxide can be used.

As the etchant, the following solutions can be used for example: a solution including hydrofluoric acid, nitric acid, and acetic acid; a solution including hydrofluoric acid and potassium chromate; or the like. As an example of a solution including hydrofluoric acid, nitric acid, and acetic acid, a mixed solution in which a hydrofluoric acid solution (50 wt %), a nitric acid solution (70 wt %), an acetic acid solution, and pure water are mixed at a ratio of 1:3:10:50 can be used. As an example of a solution including hydrofluoric acid and potassium chromate, a solution obtained by the following process can be used: 4.4 g of potassium dichromate, 100 ml of pure water, and 200 ml of a hydrofluoric acid solution (50 wt %) are mixed to form a mixed solution; and the obtained mixed solution and pure water are further mixed at a ratio of 1:4. However, the composition of the solution is not limited to thereto. Here, an impurity other than the intended materials is not contained in the solution that is an etchant; however, in some cases, an impurity may be contained as long as it has an intended function.

In etching treatment with use of the solution described as an example as an etchant, etching selectivity between the amorphous region and the microcrystalline region is high, and the microcrystalline region is not easily etched; thus, a part of or the whole of the amorphous region is selectively etched.

By the selective etching of a part of or the whole of the amorphous region, the microcrystalline grain in the microcrystalline region 1031 is exposed, so that the microcrystalline grain 1021 is formed as illustrated in FIG. 3B, and the active material having projections and depressions is formed.

Note that change of the etching condition allows formation of the microcrystalline grain in a shape illustrated in FIG. 1B or FIG. 2A. For example, in addition to the amorphous region 1032, a part of the microcrystalline region 1031 is etched, whereby the cross-sectional area of the microcrystalline grain 1021 is smaller than the cross-sectional area of the microcrystalline region 1031 in some cases. Such an example includes a case where corners of the crystal grain are formed into a round shape by etching of the corners of the microcrystalline grain in the microcrystalline region 1031 as illustrated in FIG. 3B and a case where the interval between neighboring microcrystalline grains is increased by etching of side surfaces of the microcrystalline grain in the microcrystalline region 1031. When the cross-sectional area of the microcrystalline grain 1021 is smaller than the cross-sectional area of the microcrystalline region 1031, insertion and extraction of ions functioning as carriers into and from the active material become easy. Further, a part of the microcrystalline region 1031 is etched in addition to the amorphous region 1032, whereby the microcrystalline grain in a shape illustrated in FIG. 1B or FIG. 2A can be formed. When the microcrystalline grain is formed to have the shape illustrated in FIG. 1B or FIG. 2A, insertion and extraction of ions functioning as carriers into and from the active material become easy.

The etching treatment may be performed plural times or plural kinds of etching treatments may be performed. For example, after a part of or the whole of the amorphous region is removed by wet etching, the microcrystalline region 1031 may be partly removed by dry etching, so that the microcrystalline grain 1021 is formed.

As described above, the example of a manufacturing method of an electrode for a power storage device described in this embodiment is a method for manufacturing an active material by etching a part of or the whole of an amorphous region in a layer which includes a microcrystalline grain. Accordingly, an active material having projections and depressions can be easily formed without addition of a complicated step such as a step in which the current collector is processed to have projections and depressions; therefore, the manufacturing process can be simplified.

Embodiment 2

In this embodiment, a technique for introducing ions functioning as carriers in advance, into an active material of an electrode for a power storage device of one embodiment of the present invention, which is also referred to as pre-doping, will be described.

Figure 4A:
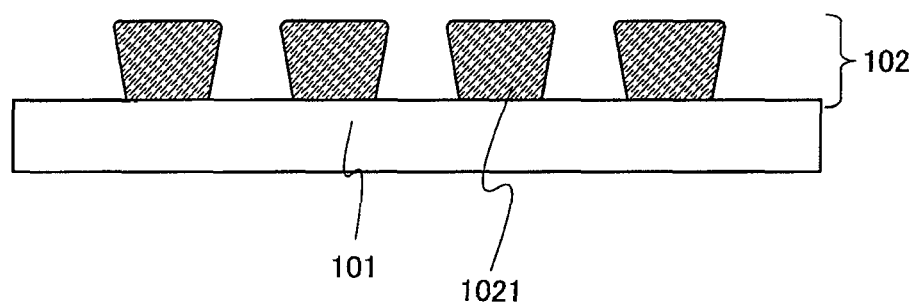
FIGS. 4A to 4C are schematic cross-sectional views illustrating an example of a method for manufacturing an electrode for a power storage device in Embodiment 2.

First, the microcrystalline grain 1021 is formed over one of surfaces of the current collector 101 in accordance with Embodiment 1 (see FIG. 4A). The process up to here corresponds to the process illustrated in FIGS. 3A and 3B.

Figure 4B:
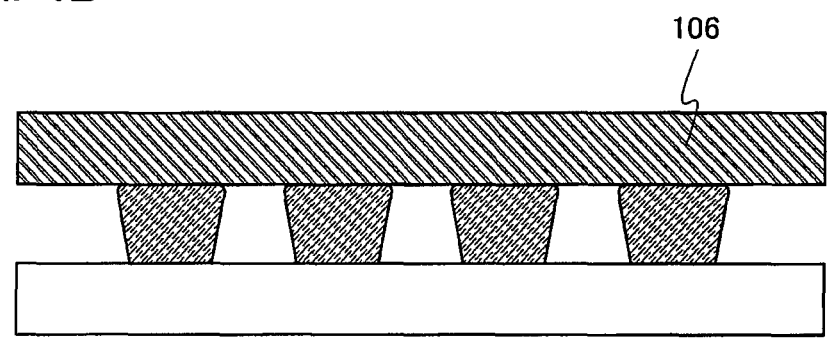

Next, a metal layer 106 including ions functioning as carriers is formed over the microcrystalline grain 1021 (see FIG. 4B).

The metal layer 106 can be formed using alkali metal, alkaline earth metal, or the like. Here, an example in which a metal sheet formed from alkali metal or alkaline earth metal is separately prepared for the metal layer 106 is described; however, formation of the metal layer 106 is not limited thereto. For example, a metal film can be deposited by a chemical vapor deposition method, a physical vapor deposition method, or the like. As an example of a chemical vapor deposition method, a CVD method can be used. As an example of a physical vapor deposition method, a sputtering method or a vacuum evaporation method can be used. Note that in FIG. 4B, the metal layer 106 having a uniform thickness is shown, but is not limited thereto, and may have a region with differing film thicknesses or may be a plurality of divided regions.

Figure 4C:
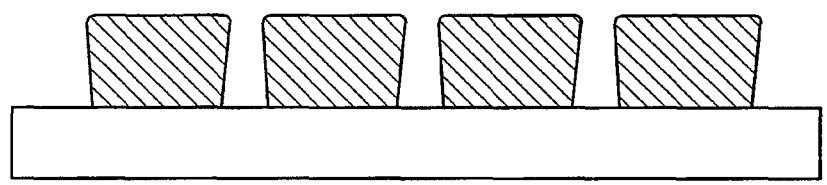

After that, while ionizing the metal layer 106, the ionized metal is impregnated with the active material 102. Ionization of the metal layer 106 proceeds over time, and then, the active material 102 illustrated in FIG. 4C is formed. At this stage, although the volume of the microcrystalline grains 1021 of the active material 102 expands as in FIG. 4C, by forming the active material to have projections and depressions in advance, stress on the active material can be reduced even when the volume expansion occurs. Therefore, the effect on the active material due to the volume expansion can be reduced. Although in FIG. 4C, the whole metal layer 106 is ionized and the ionized metal is impregnated with the active material 102, pre-doping is not limited thereto, and a part of the metal layer 106 may be left over a surface of the active material 102.

In accordance with the example shown in FIGS. 4A to 4C, ions functioning as carriers can be introduced in advance to the electrode for a power storage device. By insertion of ions functioning as carriers in advance to the electrode for a power storage device, the number of ions functioning as carriers is increased, so that the working voltage can be high.

Note that this embodiment can be combined with any of other embodiments as appropriate.

Embodiment 3

In this embodiment, a battery will be described as an example of a power storage device of an embodiment of the present invention.

Figure 5:
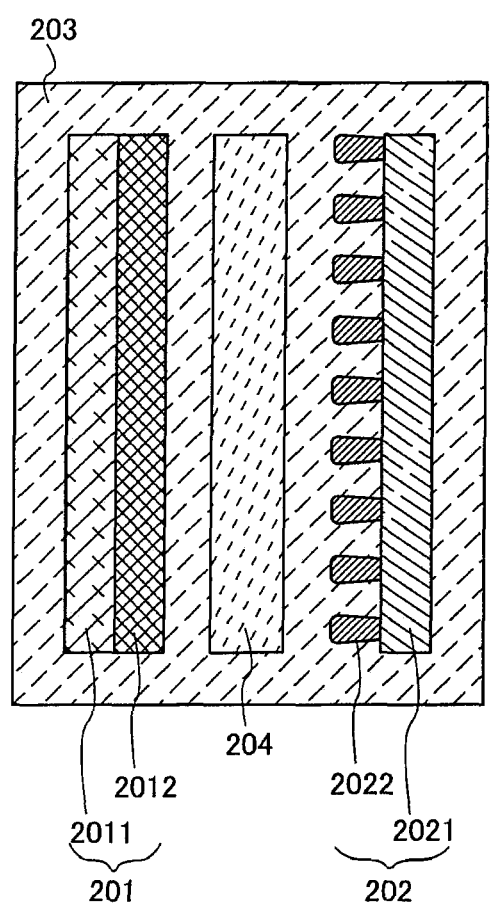
FIG. 5 is a schematic cross-sectional view illustrating an example of a structure of a battery in Embodiment 3.

A structure of a battery of this embodiment is described with reference to FIG. 5. FIG. 5 is a schematic view illustrating an example of a structure of a battery in this embodiment.

The battery illustrated in FIG. 5 includes a positive electrode 201, a negative electrode 202, an electrolyte 203, and a separator 204.

The positive electrode 201 includes a current collector 2011 and an active material 2012.

The current collector 2011 can be formed using a conductive material such as aluminum, copper, nickel, titanium, or the like. Alternatively, the current collector 2011 can be formed using an alloy material including plural materials selected from the above conductive materials, e.g., an Al—Ni alloy, an Al—Cu alloy, or the like. Further, the current collector 2011 is not limited to a conductive plate, but can be formed using a conductive layer which has been separately formed over a substrate and then separated from the substrate.

The active material 2012 can be formed using, for example, a material including ions functioning as carriers and a transition metal. As an example of the material including ions functioning as carriers and a transition metal, a material which is represented by a general formula $A_xM_yPO_z$ ($x>0$, $y>0$, $z>0$). Here, A indicates alkali metal such as lithium, sodium, or potassium or earth alkali metal such as beryllium, magnesium, calcium, strontium, or barium, and M indicates transition metal such as iron, nickel, manganese, or cobalt. As the material represented by the general formula $A_xM_yPO_z$ ($x>0$, $y>0$, $z>0$)), lithium iron phosphate, sodium iron phosphate, or the like can be given. Alternatively, a material represented by a general formula $A_mM_kO_l$ ($m>0$, $k>0$, $l>0$) can be used. Here, A indicates alkali metal such as lithium, sodium, or potassium or earth alkali metal such as beryllium, magnesium, calcium, strontium, or barium, and M indicates transition metal such as iron, nickel, manganese, or cobalt. As the material represented by the general formula $A_mM_kO_l$ ($m>0$, $k>0$, $l>0$), lithium cobaltate, lithium manganate, or the like can be given.

The negative electrode 202 includes a current collector 2021 and an active material 2022. As the negative electrode 202, the electrode for a power storage device described in Embodiment 1 or 2 can be used. The current collector 2021 can be formed using, for example, a conductive body applicable to the current collector 101 illustrated in FIGS. 1A and 1B. The active material 2022 can be formed using, for example, a material applicable to the active material 102 illustrated in FIGS. 1A and 1B.

As the separator 204, paper, nonwoven fabric, glass fiber, or synthetic fiber may be used. As the synthetic fiber, such materials as nylon (polyamide), vinylon (also called vinalon) (polyvinyl alcohol fiber), polyester, acrylic, polyolefin, and polyurethane may be used. More examples of materials of the separator 204 are polymer materials (high-molecular compounds) such as fluorine-based polymer, polyether (e.g., polyethylene oxide and polypropylene oxide), polyolefin (e.g., polyethylene and polypropylene), polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, a high polymer material such as cellulose, paper, and nonwoven fabric. These materials can be used either alone or in combination as the separator 204. However, it is necessary to choose a material which will not dissolve in the electrolyte 203, as the separator 204.

The electrolyte 203 can be formed using a material including ions functioning as carriers, a material through which ions functioning as carriers transfer, or the like can be used. Examples of such a material include sodium chloride (NaCl), sodium fluoride (NaF), sodium perchlorate (NaClO$_4$), sodium fluoroborate (NaBF$_4$), lithium chloride (LiCl), lithium fluoride (LiF), lithium perchlorate (LiClO$_4$), lithium fluoroborate (LiBF$_4$), potassium chloride (KCl), potassium fluoride (KF), potassium perchlorate (KClO$_4$), and potassium fluoroborate (KBF$_4$). These materials can be used either alone or in combination in the electrolyte 203. Alternatively, a lithium salt material containing fluorine can be used, e.g., lithium hexafluorophosphate (LiPF$_6$), lithium hexafluoroarsenate (LiAsF$_6$), lithium trifluoromethansulfonate (LiCF$_3$SO$_3$), lithium bis(trifluoromethanesulfonyl)imide (LiN(SO$_2$CF$_3$)$_2$), lithium bis(pentafluoroethanesulfonyl)imide (LiN(SO$_2$C$_2$F$_5$)$_2$), or the like.

Alternatively, the electrolyte 203 can be formed by dissolving the above material into a solvent. Examples of the solvent include a cyclic carbonate such as ethylene carbonate (EC), propylene carbonate (PC), butylene carbonate (BC), and vinylene carbonate (VC); an acyclic carbonate such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); an aliphatic carboxylic acid ester such as methyl formate, methyl acetate, methyl propionate, and ethyl propionate; a γ-lactone such as γ-butyrolactone; an acyclic ether such as 1,2-dimethoxyethane (DME), 1,2-diethoxyethane (DEE), and ethoxymethoxy ethane (EME); a cyclic ether such as tetrahydrofuran and 2-methyltetrahydrofuran; an alkyl phosphate ester such as dimethylsulfoxide, 1,3-dioxolane, trimethyl phosphate, triethyl phosphate, and trioctyl phosphate; and fluorides thereof. These materials can be used either alone or in combination as the solvent of the electrolyte 203.

As illustrated in FIG. 5, the example of the power storage device in this embodiment has a structure in which the electrode for a power storage device of one embodiment of the present invention is used for the negative electrode. With such a structure, the effect caused by the volume expansion of a material included in the negative electrode can be reduced, and thus, a highly-reliable power storage device can be provided.

Note that one embodiment of the battery in this embodiment is formed to have a variety of structures such as a button structure, a stacked structure, and a cylindrical structure.

Note that this embodiment can be combined with or replaced by any of the other embodiments as appropriate.

Embodiment 4

In this embodiment, a capacitor will be described as an example of a power storage device which is one embodiment of the preset invention.

Figure 6:
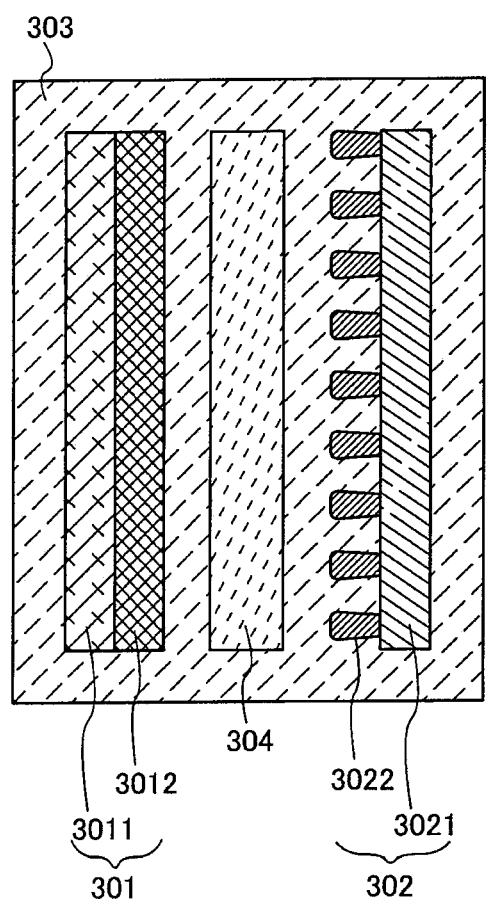
FIG. 6 is a schematic cross-sectional view illustrating an example of a structure of a capacitor in Embodiment 3.

A structure of the capacitor of this embodiment is described with reference to FIG. 6. FIG. 6 is a schematic view illustrating an example of a structure of the capacitor of this embodiment.

The capacitor illustrated in FIG. 6 includes a positive electrode 301, a negative electrode 302, an electrolyte 303, and a separator 304.

The positive electrode 301 includes a current collector 3011 and an active material 3012.

The current collector 3011 can be formed using, for example, a conductive material such as aluminum, copper, titanium, nickel, or the like. Alternatively, the current collector 3011 can be formed using an alloy material including a plurality of the above conductive materials, e.g., an Al—Ni alloy, an Al—Cu alloy, or the like.

The active material 3012 can be formed using, for example, a carbon material such as activated carbon, carbon nanotube, fullerene, or polyacene.

The negative electrode 302 includes a current collector 3021 and an active material 3022.

As the negative electrode 302, for example, the electrode for a power storage device described in Embodiment 1 can be used. The current collector 3021 can be formed using a conductive body applicable to the current collector 101 illustrated in FIGS. 1A and 1B. The active material 3022 can be formed using a material and a structure applicable to the active material 102 illustrated in FIGS. 1A and 1B.

As the separator 304, paper, nonwoven fabric, glass fiber, synthetic fiber, or the like may be used. As the synthetic fiber, such materials as nylon (polyamide), vinylon (also called vinalon) (polyvinyl alcohol fiber), polyester, acrylic, polyolefin, and polyurethane may be used. More examples of materials of the separator 304 are polymer materials (high-molecular compounds) such as fluorine-based polymer, polyether (e.g., polyethylene oxide and polypropylene oxide), polyolefin (e.g., polyethylene and polypropylene), polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, a high polymer material such as cellulose, paper, and nonwoven fabric. These materials can be used either alone or in combination as the separator 304. However, it is necessary to choose a material which will not dissolve in the electrolyte 303, as the separator 304.

The electrolyte 303 can be formed using a material including ions functioning as carriers, a material through which ions functioning as carriers can transfer, or the like can be used. Examples of such a material include sodium chloride (NaCl), sodium fluoride (NaF), sodium perchlorate (NaClO$_4$), sodium fluoroborate (NaBF$_4$), lithium chloride (LiCl), lithium fluoride (LIP), lithium perchlorate (LiClO$_4$), lithium fluoroborate (LiBF$_4$), potassium chloride (KCl), potassium fluoride (KF), potassium perchlorate (KClO$_4$), and potassium fluoroborate (KBF$_4$). These materials can be used either alone or in combination in the electrolyte 303. Alternatively, a lithium salt material containing fluorine can be used, e.g., lithium hexafluorophosphate (LiPF$_6$), lithium hexafluoroarsenate (LiAsF$_6$), lithium trifluoromethansulfonate (LiCF$_3$CF$_3$), lithium bis(trifluoromethanesulfonyl)imide (LiN(SO$_2$CF$_3$)$_2$), lithium bis(pentafluoroethanesulfonyl)imide (LiN(SO$_2$C$_2$F$_5$)$_2$), or the like.

Alternatively, the electrolyte 303 can be formed by dissolving the above material into a solvent. Examples of the solvent include a cyclic carbonate such as ethylene carbonate (EC), propylene carbonate (PC), butylene carbonate (BC), and vinylene carbonate (VC); an acyclic carbonate such as dimethyl carbonate (DMC), diethyl carbonate (DEC), ethylmethyl carbonate (EMC), methylpropyl carbonate (MPC), methylisobutyl carbonate (MIBC), and dipropyl carbonate (DPC); an aliphatic carboxylic acid ester such as methyl formate, methyl acetate, methyl propionate, and ethyl propionate; a γ-lactone such as γ-butyrolactone; an acyclic ether such as 1,2-dimethoxyethane (DME), 1,2-diethoxyethane (DEE), and ethoxymethoxy ethane (EME); a cyclic ether such as tetrahydrofuran and 2-methyltetrahydrofuran; an alkyl phosphate ester such as dimethylsulfoxide, 1,3-dioxolane, trimethyl phosphate, triethyl phosphate, and trioctyl phosphate; and fluorides thereof. These materials can be used either alone or in combination as the solvent of the electrolyte 303.

As illustrated in FIG. 6, the example of the power storage device of this embodiment has a structure in which the electrode for a power storage device which is one embodiment of the present invention is used for the negative electrode. With such a structure, the effect caused by the volume expansion of the material included in the negative electrode can be reduced, and thus a highly-reliable power storage device can be provided.

Note that this embodiment can be combined with or replaced by any of the other embodiments as appropriate.

Example 1

In this example, an electrode for a power storage device and a power storage device including the electrode, which were actually manufactured, will be described.

First, an electrode for a power storage device in this example is described.

In this example, a 3 μm-thick n-type microcrystalline silicon film was formed over a conductive plate formed from titanium by a CVD method, and then the microcrystalline silicon film was partly etched, so that an electrode for a power storage device was manufactured. Note that conditions of deposition by a CVD method are as follows: the power was 100 W; the frequency was 60 MHz; a gas including SiH$_4$, PH$_3$ (diluted with H$_2$), H$_2$, and Ar (at a ratio of SiH$_4$:PH$_3$:H$_2$:Ar=3 sccm:12 sccm:400 sccm:400 sccm) was used; the substrate temperature was set to 280° C.; the distance between an upper electrode and a lower electrode was 20 mm; and the pressure was 200 Pa. Then, the microcrystalline silicon film was etched with use of a solution. The solution was formed as follows: 4.4 g of potassium dichromate, 100 ml of pure water, and 200 ml of a hydrofluoric acid (50 wt %) were mixed to form a mixed solution; and then the obtained mixed solution and pure water were further mixed at a ratio of 1:4. The temperature of the mixed solution used for the etching was 24° C. Two kinds of electrodes for power storage devices were manufactured; one was manufactured in a condition where the etching time was 20 seconds, and the other was manufactured in a condition where the etching time was 30 seconds.

Figure 7A:
FIGS. 7A to 7C are images each describing an electrode for a power storage device in Example 1.
Figure 7B:
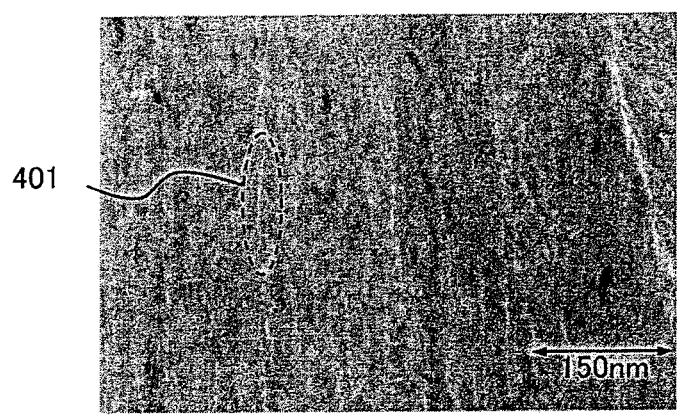
Figure 7C:
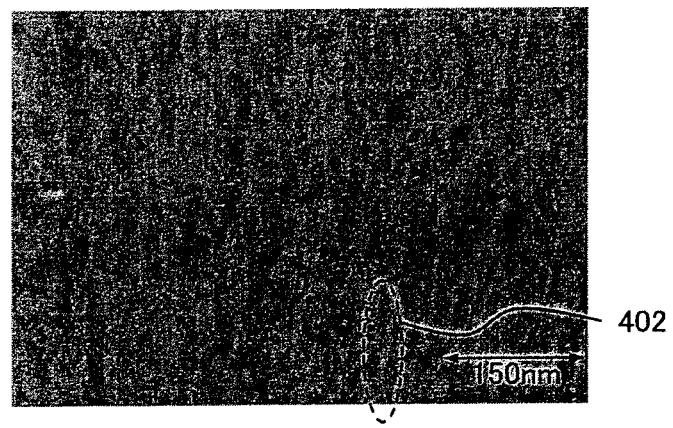

The cross-sectional structures of active materials in the manufactured electrodes for power storage devices are described with reference to FIGS. 7A to 7C. FIGS. 7A to 7C are transmission electron microscope (TEM) images for showing the cross-sectional structures of the active materials in the electrodes for power storage devices of this example.

FIG. 7A is a cross-sectional TEM image of an active material in an electrode for a power storage device manufactured for comparison, in which etching of a microcrystalline silicon film was not performed.

FIG. 7B is a cross-sectional TEM image of an active material in the electrode for a power storage device in which etching of a microcrystalline silicon film was performed for 20 seconds. As compared to the active material shown in FIG. 7A, in the active material in FIG. 7B, an amorphous region in the microcrystalline silicon film was partly removed, and a low-density region (for example, a region 401) was formed. The low-density region extends from the surface of the crystalline silicon film to the inside of the crystalline silicon film. Note that the portion other than the low-density region is a region including microcrystalline grains, which is a region where a plurality of microcrystalline grains aggregate.

FIG. 7C is a cross-sectional TEM image of an active material in the electrode for a power storage device in which etching of a microcrystalline silicon film was performed for 30 seconds. As compared to the active material shown in FIG. 7A, in the active material in FIG. 7C, an amorphous region in the microcrystalline silicon film was partly removed, and a low-density region (for example, a region 402) was formed.

Figure 8:
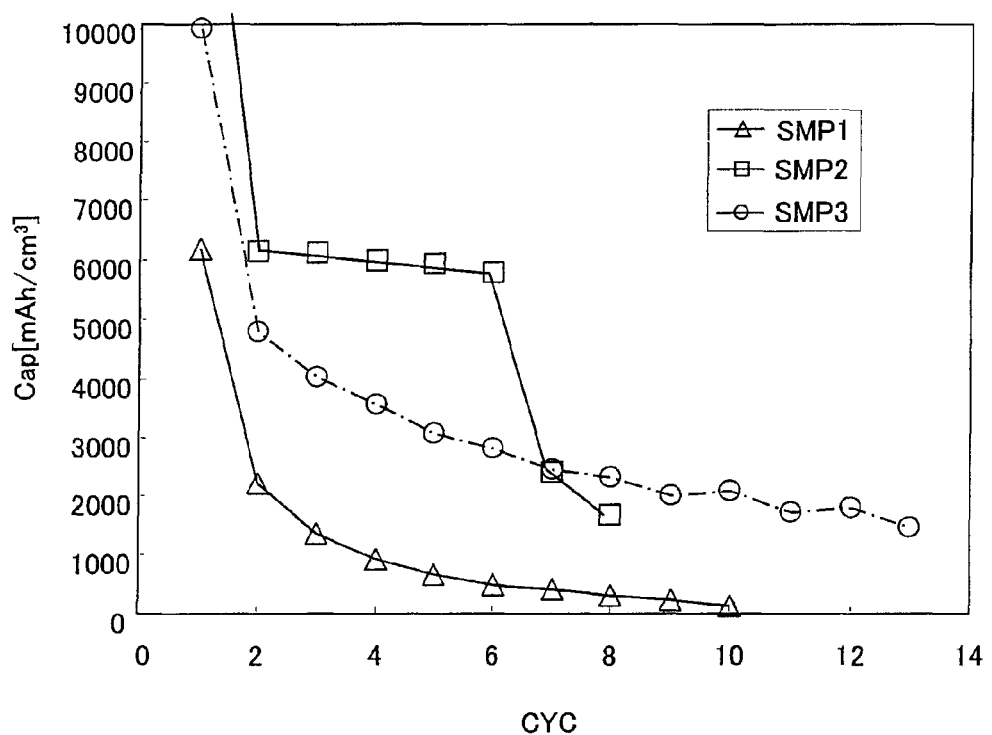
FIG. 8 is a graph for describing power storage devices in Example 1.

In addition, three power storage devices including respective electrodes for the power storage devices, which are described with FIGS. 7A to 7C, as one of a pair of electrodes were manufactured, and the power storage devices were repeatedly charged and discharged, whereby capacitance of each power storage device was measured. Results are described with reference to FIG. 8. FIG. 8 is a graph for describing the power storage devices in this example, where a horizontal axis indicates the number of times of charge and discharge (also referred to as the number of cycle times or CYC) and a vertical axis indicates capacitance (also referred to as Cap) of the power storage devices. Note that in each of the manufactured power storage devices, lithium was used for the other electrode, polypropylene was used for a separator, and a mixture of lithium hexafluorophosphate, ethylene carbonate, and diethyl carbonate was used for an electrolyte. SMP1 is a sample of the power storage device including the electrode for a power storage device, which is described with FIG. 7A. SMP2 is a sample of the power storage device including the electrode for a power storage device, which is described with FIG. 7B. SMP3 is a sample of the power storage device including the electrode for a power storage device, which is described with FIG. 7C.

As shown in FIG. 8, capacitance of SMP2 and capacitance of SMP3 are higher than capacitance of SMP1 even when charging and discharging operation is performed repeatedly.

As described in this example, an electrode for a power storage device, in which an active material is formed by selectively etching a part of or the whole of an amorphous region in a layer including microcrystalline grains, is used, whereby a power storage device with high capacitance can be provided even when charging and discharging operation is performed repeatedly.

This application is based on Japanese Patent Application serial no. 2009-226294 filed with Japan Patent Office on Sep. 30, 2009, the entire contents of which are hereby incorporated by reference.

What is claimed is:

1. A method for manufacturing an electrode for a power storage device, the method comprising the steps of:
   forming a conductive body functioning as a current collector;
   depositing a mixed layer including an amorphous region and a microcrystalline region over one of surfaces of the conductive body; and
   etching the mixed layer selectively, so that a part of or a whole of the amorphous region is removed and the microcrystalline region is exposed, thereby, forming the electrode for the power storage device,
   wherein the mixed layer comprises a microcrystalline silicon film, a microcrystalline silicon germanium film, or a microcrystalline germanium film.

2. The method for manufacturing an electrode for a power storage device according to claim 1, wherein the etching is performed with use of a mixed solution as an etchant, which includes a substance oxidizing the amorphous region and a substance dissolving the oxidized amorphous region.

3. The method for manufacturing an electrode for a power storage device according to claim 1,
   wherein the etching is performed with use of a mixed solution as an etchant, which includes a substance oxidizing the amorphous region and a substance dissolving the oxidized amorphous region, and
   wherein potassium chromate is used as the substance oxidizing the amorphous region, and hydrofluoric acid is used as the substance dissolving the oxidized amorphous region.

4. The method for manufacturing an electrode for a power storage device according to claim 1, wherein the etching is performed with use of a mixed solution as an etchant, which includes a substance oxidizing the amorphous region, a substance dissolving the oxidized amorphous region, and a substance controlling a speed of oxidation of the amorphous region and a speed of dissolution of the oxidized amorphous region.

5. The method for manufacturing an electrode for a power storage device according to claim 1,
   wherein the etching is performed with use of a mixed solution as an etchant, which includes a substance oxidizing the amorphous region, a substance dissolving the oxidized amorphous region, and a substance controlling a speed of oxidation of the amorphous region and a speed of dissolution of the oxidized amorphous region, and
   wherein nitric acid is used as the substance oxidizing the amorphous region, hydrofluoric acid is used as the substance dissolving the oxidized amorphous region, and acetic acid is used as the substance controlling the speed of oxidation of the amorphous region and the speed of dissolution of the oxidized amorphous region.

6. The method for manufacturing an electrode for a power storage device according to claim 1, wherein a grain size of the microcrystal is equal to or larger than 2 nm and equal to or smaller than 50 nm.

7. The method for manufacturing an electrode for a power storage device according to claim 1, wherein the conductive body comprises aluminum, copper, nickel, or titanium.

8. The method for manufacturing an electrode for a power storage device according to claim 1, wherein the mixed layer is depositing by glow discharge plasma with use of a mixture comprising a deposition gas, hydrogen, and a rare gas.

9. The method for manufacturing a power storage device according to claim 1, further comprising a step of forming a metal layer over the mixed layer, wherein the metal layer comprises a metal sheet formed from lithium, sodium, or potassium.

10. The method for manufacturing a power storage device according to claim 1, further comprising a step of forming a metal layer over the mixed layer,
    wherein the metal layer comprises a metal sheet formed from beryllium, magnesium, calcium, strontium, or barium.

11. The method for manufacturing a power storage device according to claim 1, further comprising a step of forming a metal layer over the mixed layer,
    wherein the metal layer includes alkali metal or alkaline earth metal.

12. A method for manufacturing a power storage device which includes a positive electrode, a negative electrode, and an electrolyte, the method comprising the steps of:
    forming a conductive body functioning as a current collector;
    depositing a mixed layer including an amorphous region and a microcrystalline region over one of surfaces of the conductive body; and
    etching the mixed layer selectively, so that a part of or a whole of the amorphous region is removed and the microcrystalline region is exposed, thereby, forming the negative electrode of the power storage device,
    wherein the mixed layer comprises a microcrystalline silicon film, a microcrystalline silicon germanium film, or a microcrystalline germanium film.

13. The method for manufacturing a power storage device according to claim 12, wherein the etching is performed with use of a mixed solution as an etchant, which includes a substance oxidizing the amorphous region and a substance dissolving the oxidized amorphous region.

14. The method for manufacturing a power storage device according to claim 12, wherein the etching is performed with use of a mixed solution as an etchant, which includes a substance oxidizing the amorphous region, a substance dissolving the oxidized amorphous region, and a substance controlling a speed of oxidation of the amorphous region and a speed of dissolution of the oxidized amorphous region.

15. The method for manufacturing a power storage device according to claim 12, wherein a grain size of the microcrystal is equal to or larger than 2 nm and equal to or smaller than 50 nm.

16. The method for manufacturing a power storage device according to claim 12, wherein the conductive body comprises aluminum, copper, nickel, or titanium.

17. The method for manufacturing a power storage device according to claim 12, further comprising a step of forming a metal layer over the mixed layer, wherein the metal layer comprises a metal sheet formed from lithium, sodium, or potassium.

18. The method for manufacturing a power storage device according to claim 12, further comprising a step of forming a metal layer over the mixed layer,
wherein the metal layer comprises a metal sheet formed from beryllium, magnesium, calcium, strontium, or barium.

19. The method for manufacturing a power storage device according to claim 12, further comprising a step of forming a metal layer over the mixed layer of the negative electrode,
wherein the metal layer includes alkali metal or alkaline earth metal.

* * * * *